United States Patent [19]

Tokuhara

[11] Patent Number: 4,474,461

[45] Date of Patent: Oct. 2, 1984

[54] COPYING APPARATUS HAVING A MAGNIFICATION CHANGING FUNCTION

[75] Inventor: Mitsuhiro Tokuhara, Chigasaki, Japan

[73] Assignee: Canon Kabushiki Kaisha, Tokyo, Japan

[21] Appl. No.: 377,677

[22] Filed: May 12, 1982

[30] Foreign Application Priority Data

May 18, 1981 [JP] Japan .................................. 56-75480

[51] Int. Cl.[3] ........................ G03B 27/34; G03B 27/40

[52] U.S. Cl. .................................. 355/56; 354/195.12

[58] Field of Search ............................ 355/55, 57, 56; 354/197

[56] References Cited

U.S. PATENT DOCUMENTS 3,277,783 10/1966 Eggert ............................ 354/197 X 3,436,145 4/1969 Bechtold ........................... 355/55 X 3,625,595 12/1971 Fleishman ......................... 355/55 X 3,850,507 11/1974 Uesugi ............................ 354/197 X

*Primary Examiner*—Richard A. Wintercorn

*Attorney, Agent, or Firm*—Fitzpatrick, Cella, Harper & Scinto

[57] ABSTRACT

A copying apparatus capable of varying the imaging magnification of the image of an original projected upon a photosensitive medium has an imaging optical system for forming the image of the orignal on the photosensitive medium, and a member for supporting the imaging optical system. The imaging optical system is provided with a plurality of optical elements. At least one magnification changing optical element of the optical elements is capable of changing its position relative to the other optical elements to vary the focal length of the imaging optical system. The member for supporting the imaging optical system includes a first device capable of moving at least one of the magnification changing optical elements by a minute amount in the direction of the optical axis, and a second device for moving the magnification changing optical elements by a predetermined amount to vary the focal length of the imaging optical system.

7 Claims, 7 Drawing Figures

COPYING APPARATUS HAVING A MAGNIFICATION CHANGING FUNCTION

BACKGROUND OF THE INVENTION

1. Field of the Invention

This invention relates to a copying apparatus having a magnification changing function, and more particularly to a copying apparatus provided with an optical adjusting mechanism capable of simply compensating for any error of the focal length in the manufacture of a projection lens system.

2. Description of the Prior Art

Generally, the following errors occur as manufacturing errors in a copying apparatus or the like:

(1) An error from the initial design value of the focal length of the projection lens system; and (2) An error from the initial design value of the object-image distance. These errors may result in an incorrect focus which in turn may result in degradation of the quality of copy image, and such errors must be corrected and particularly must be corrected at each magnification in a variable magnification copying apparatus.

If a so-called zoom lens is used as the lens, the object-image distance becomes constant at each magnification.

Generally, in a copying apparatus, one-to-one magnification becomes the standard, but in a variable magnification copying apparatus using a zoom lens, an error from the initial design value of the object-image distance may be compensated for during one-to-one copying. At this time, the focal length of the lens is varied and the manufacturing error of the lens itself must also be compensated for.

In a copying apparatus using a single focus lens as the projection lens system, where the single focus lens is deviated from a predetermined focal length due to the manufacturing error, a method of correcting the focal length thereof is known from Japanese Laid Open Patent Application No. 24832/1978. According to this, a load is imparted to a mirror disposed in the lens to create a deformation in the elasticity range and the focal length is adjusted by the curvature of this mirror. With this method, however, the deviation of the lens system from its initial performance has been great.

SUMMARY OF THE INVENTION

It is an object of the present invention to provide a copying apparatus provided with a projection optical system whose focal length can be finely adjusted and which satisfies its initially set imaging performance even if magnification change is further effected after adjustment of the focal length has been effected.

It is a further object of the present invention to provide a copying apparatus provided with a projection optical system in which the manufacturing error of the projection optical system or the manufacturing error of the length of the optical path between an object and the image plane can be readily adjusted.

In the copying apparatus according to the present invention, in the projection optical system, use is made of an optical lens whose focal length is varied by moving some of the optical elements which form the optical system relative to the other optical elements, for example, a zoom lens whose focal length can be continuously varied or a lens whose focal length can be discontinuously varied. At least one of the optical elements used for magnification change can be moved by a minute amount to vary the focal length in the direction of the optical axis by an auxiliary moving means different from a main moving means for magnification change. For example, the projection optical system moves at least some of said optical elements for magnification change at one-to-one imaging position by the use of the auxiliary moving means to set them so that the surface of an original and a photosensitive medium may assume optically conjugate positions. It has been found that the initially set imaging performance is sufficiently satisfied even if the optical elements for magnification change are then moved for magnification change by the use of the main moving means to change from the one-to-one imaging condition.

As an adjusting method for eliminating any manufacturing error of the projection optical system, use is made of a primary standard in which the length of the optical path between the surface of the original and the photosensitive medium has been accurately set when the projection optical system is provided at the one-to-one magnification position. Where there is a manufacturing error in the projection optical system, it is set by the use of the auxiliary moving means so that the surface of the original and the photosensitive medium may assume optically conjugate potitions. Where there is a manufacturing error in the length of the optical path between the surface of the original and the photosensitive medium when the thus adjusted projection optical system is incorporated into the actual copying apparatus, it is desirable to correct the length of the optical path by movement of a mirror disposed between the surface of the original and the photosensitive medium, instead of correcting the length of the optical path by the projection optical system.

Also, when the projection optical system is incorporated into the copying apparatus without the projection optical system being pre-adjusted as in the above-described adjusting method, the projection optical system may be provided at the one-to-one imaging position between the surface of the original and the photosensitive medium and a predetermined optical element may be moved by the use of the auxiliary moving means so that the surface of the original and the photosensitive medium may assume optically conjugate positions. In this case, the manufacturing error of the projection optical system and the manufacturing error of the length of the optical path between the surface of the original and the photosensitive medium are corrected at the same time.

The invention will become more fully apparent from the following detailed description thereof taken in conjunction with the accompanying drawings.

DESCRIPTION OF THE PREFERRED EMBODIMENTS

Figure 1:
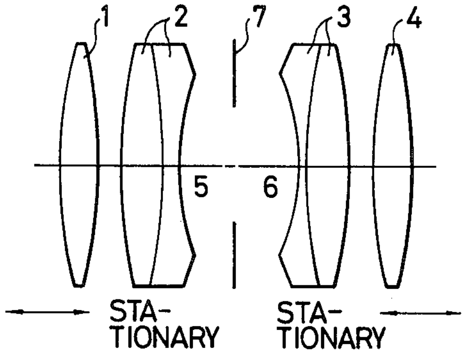
FIG. 1 shows an embodiment of a zoom lens applicable to the copying apparatus of the present invention.
Figure 2:
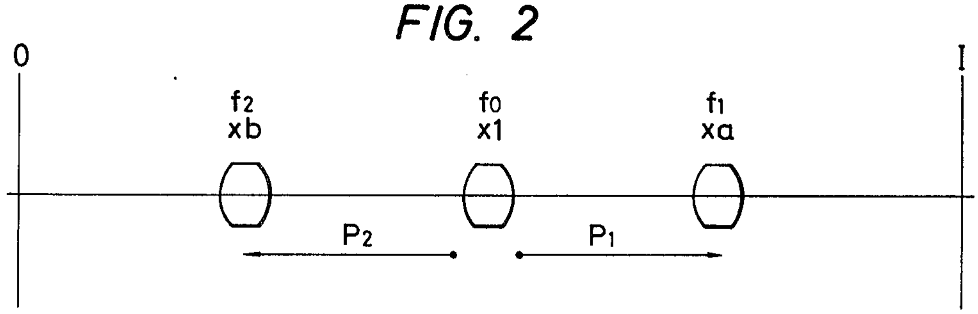
FIG. 2 illustrates the position of the zoom lens during magnification change.

FIG. 1 shows an embodiment of a zoom lens which is applied to the copying apparatus of the present invention. FIG. 2 shows the condition of movement of the entire zoom lens system in a variable magnification copying apparatus. In this zoom lens, movable groups 1 and 4 are movable in opposite directions relative to lens groups 2 and 3 fixed symmetrically with respect to a diaphragm 7. The focal length of the zoom lens becomes variable by this movement of the interior of the lens. In a variable magnification copying apparatus, during magnification change, the lens is moved as a whole to change the magnification and the movement of the whole of the lens is accompanied by movement of the interior of the lens.

If one-to-one copying is the standard, the lens whose focal length was $f_0$ during one-to-one copying is moved as a whole by $P_1$ toward the image plane side during a reduced magnification a and along therewith, the focal length becomes $f_1$ by movement of the interior of a lens element for magnification change, and during an enlarged magnification b, the lens is moved as a whole by $P_2$ toward the object side and along therewith, the focal length becomes $f_2$ by movement of the interior of the lens element for magnification change, so that a regular imaging relation is kept at each magnification. If the object-image distance between the object O and the image I is L and the focal length during one-to-one copying is $f_0$ and the principal point spacing during one-to-one copying is $\Delta_0$ and the focal length during magnification m is f and the principal point spacing during magnification m is $\Delta$, then the following equation is established:

$$L = 4f_0 + \Delta_0 = \left(\sqrt{m} + \frac{1}{\sqrt{m}}\right)^2 \times f + \Delta$$

That is, during magnification change, the focal length is changed from $f_0$ to f by movement of the interior of the lens.

Also, when movement of the whole of the lens is considered, if the distance of movement of the entire lens from the system of one-to-one magnification to the system of magnification m is P, the following equation is established:

$$P = \left| \frac{L}{m+1} - \frac{L}{2} \right|$$

Usually, when a lens is manufactured, an error in the focal length of the entire lens system is surely created by errors in refractive index, radius of curvature and intersurface spacing.

Figure 3:
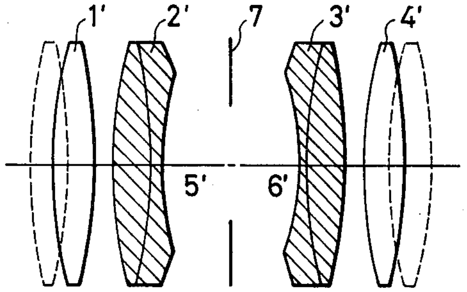
FIG. 3 shows the manner of focus adjustment of the zoom lens at one-to-one imaging position.

FIG. 3 shows the manner in which the moving starting point of the lens element is changed by adjustment of the focus position during one-to-one copying of the zoom lens applied to the present invention. In FIG. 3, lens groups 2' and 3' correspond to the lens groups 2 and 3 shown in FIG. 1, and these lens groups 2' and 3' are provided at positions deviated from regular positions and accordingly, the spacings 5' and 6' between the lens groups 2', 3' and a diaphragm 7 are deviated from regular spacings 5 and 6. To correct this error in manufacture, the lens groups 1 and 4 to be moved during zooming have been moved from positions indicated by dotted lines to positions 1' and 4'. The positions of the lens groups 1' and 4' during one-to-one copying provide the starting point from which they are moved during zooming. This manufacturing error can be compensated for by displacing the movement starting point so as to satisfy the following equation only by movement of the interior of the zoom lens without imparting the movement of the whole of the zoom lens during one-to-one copying. If, in the one-to-one magnification system, the regular focal length of the lens is $f_0$ and the principal point spacing is $\Delta_0$ and the focal length of the lens after movement of the starting point is f and the principal point spacing after movement of the starting point is $\Delta$, then $$4f + \Delta = 4f_0 + \Delta_0.$$

Generally, in a zoom lens, movement of the interior thereof takes place with movement of the whole thereof and therefore, a pin provided on the lens barrel moves along a predetermined cam curve, but in the present invention, a moving mechanism may be added for effecting only the movement of at least a part of the lens element for magnification change without imparting the movement of the whole of the lens during one-to-one copying, and any other movement adjusting mechanism becomes unnecessary.

The zoom lens is originally designed such that even if the movable lens groups 1' and 4' to be moved during magnification change are moved by a minute amount for the focus adjustment, aberrations are suppressed for the movement of these movable lens groups and accordingly, the aberrations are not greatly deviated by such movement. Also, even in a case where, in a copying apparatus, there is an error within a certain tolerance in the object-image distance in relation to the depth of the lens, the present invention may be used to displace the position of the starting point of the zoom lens and vary the focal length thereof.

What has been described above shows that the manufacturing error can be compensated for by displacement of the position of the starting point of the lens during one-to-one copying, and the inventor has further ascertained that a predetermined imaging relation can be maintained not only during one-to-one copying but also during magnification change by effecting the movement of the whole and interior of the lens a initially set, i.e. as originally designed, from the displaced movement starting point.

Figure 4:
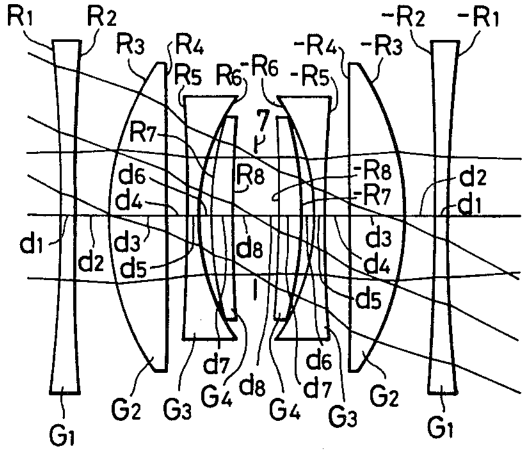
FIG. 4 is a cross-sectional view showing an embodiment of the zoom lens applicable to the copying apparatus of the present invention.

FIG. 4 shows a lens cross-section of an embodiment of the zoom lens used as the projection optical system of the copying apparatus of the present invention, and this zoom lens is an orthometa type lens which is symmetrical with respect to a diaphragm 7. Movable groups G2, G3 and G4 are internally moved relative to a stationary group G1 to vary the focal length of the entire lens system. The numerical data of this lens are as follows. First, the data for one-to-one copying are shown. $R_i$ represents the radius of curvature, $d_i$ represents the intersurface spacing or air space. The unit for both is mm.

| | | | | | Refractive index N | Abbe No. |
|---|---|---|---|---|---|---|
| G1 | R1 | −230.72 | $d_1$ | 2.5 | 1.56138 | 45.2 |
| | R2 | 749.58 | $d_2$ | 0.87 | 1 | |

-continued

| | | | Refractive index N | Abbe No. |
|---|---|---|---|---|
| G2 | R3 41.428 | $d_3$ 10 | 1.744 | 44.7 |
| | R4 −2337.7 | $d_4$ 3.27 | 1 | |
| G3 | R5 −380.88 | $d_5$ 2. | 1.62588 | 35.7 |
| | R6 31.435 | $d_6$ 2.18 | 1 | |
| G4 | R7 58.966 | $d_7$ 4. | 1.67003 | 47.3 |
| | R8 240.78 | $d_8$ 8.836 | 1 | |

During one-to-one copying, the focal length is 145.92 mm and F No. (∞) is 6.4. During magnification change, $d_2$ and $d_8$ are varied to thereby vary the focal length. The other intersurface spacings than $d_2$ and $d_8$ are invariable. If the focal length of the lens during magnification change is f and the amount of movement of the whole of the lens from one-to-one magnification is P, the numerical data during magnification change are as follows. The unit is mm.

| | | | |
|---|---|---|---|
| × 0.786 | $d_2$ = 2.14<br>$d_8$ = 7.566 | f = 143.48 | P = 34.67 |
| × 0.754 | $d_2$ = 2.62<br>$d_8$ = 7.086 | f = 142.54 | P = 40.64 |
| × 0.667 | $d_2$ = 4.46<br>$d_8$ = 5.25 | f = 139.02 | P = 57.77 |
| × 0.639 | $d_2$ = 5.25<br>$d_8$ = 4.456 | f = 137.54 | P = 63.61 |

The focal length of the stationary lens G1 is as weak as f≈320 and very little affects the error in the focal length of the entire system and therefore, a case where the focal lengths of the movable groups G2, G3 and G4 deviate from the design values and the focal length of the entire system is wrong is substantially the worst condition. Since G2, G3 and G4 are symmetrical type lenses, errors in the symmetry thereof are unavoidable during manufacture.

Now, a case where an error occurs in the focal length when the correction of the present invention is not effected will be shown below. If Δf=0.92 (f=146.84), that is, when a manufacturing error of 0.63% occurs in Δf, the object-image distance is first subjected to a correction of 4Δf, namely, +3.68 mm, by one-to-one adjustment and, if, from that position, the interior of the lens is moved as per the initial design value and the whole of the lens is moved as per the design value, then the following errors will occur:

| Magnification | Focal length | Focus error (image side) | Magnification error |
|---|---|---|---|
| × 0.786 | f = 144.31 | −0.1 | 0.16% |
| × 0.754 | f = 143.36 | −0.12 | 0.19% |
| × 0.667 | f = 139.815 | −0.22 | 0.28% |
| × 0.639 | f = 138.33 | −0.24 | 0.29% |

Δf assumes the above value for an error of 0.63% and therefore, when the normal error of 1% to 2% is considered, the focus and magnification become greatly deviated. Accordingly, a mechanism for adjusting the focus and magnification at each magnification becomes necessary and this leads to the complication of the mechanism. In the present invention, when a manufacturing error of Δf=0.928 has occurred, the starting point is first displaced so that the spacing $d_2$ is widened by 0.587 mm and the spacing $d_8$ is narrowed by 0.587 mm, whereby the object-image distance is rendered into the condition of the design value, and the internal lens is moved by a predetermined amount from the displaced position of the starting point and a predetermined movement of the whole of the lens is effected, whereby the errors at each magnification may be improved into the following slight errors:

| Magnification m | Focal length f | Focus error | Magnification error |
|---|---|---|---|
| × 0.786 | f = 143.14 | −0.034 | 0.1% |
| × 0.754 | f = 142.21 | −0.037 | 0.02% |
| × 0.667 | f = 138.71 | −0.045 | 0.03% |
| × 0.639 | f = 137.26 | −0.05 | 0.03% |

Figure 5:
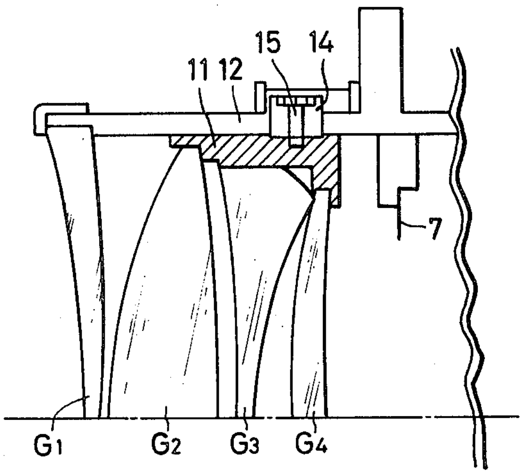
FIGS. 5, 6A and 6B show an embodiment of a mechanism for moving the lens elements of the zoom lens applied to the copying apparatus of the present invention.

Now, an embodiment of a mechanism for moving the lens elements of the lens system shown in FIG. 4 will be described by reference to FIGS. 5, 6A and 6B. FIG. 5 is a schematic cross-sectional view of a portion of the lens system contained in a lens barrel, and FIGS. 6A and 6B are schematic views of the lens barrel as seen from above.

Figure 6A:
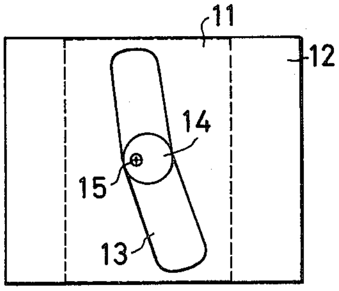
Figure 6B:
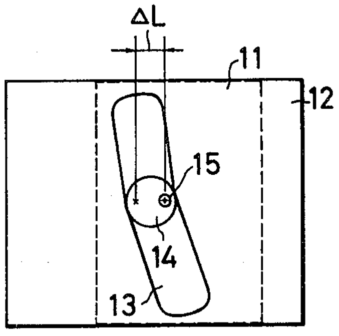

In FIGS. 5, 6A and 6B, reference numeral 11 designates an inner barrel supporting the lenses G2, G3 and G4, and reference numeral 12 is an outer barrel provided in pressure contact with the inner barrel, the outer barrel 12 being formed with a cam slot 13 for zooming. A dowel 14 is provided in the cam slot 13, and the dowel 14 and the inner barrel 11 are integrally urged against each other by a set screw 15 provided at a location deviated from the center of the dowel. Accordingly, rotation of the outer barrel 12 causes movement of the dowel 14 along the cam slot 13 which in turn causes the inner barrel secured to the dowel 14 by means of the set screw 15 to move in the direction of the optical axis, so that the lenses G2, G3 and G4 are moved together. This moving mechanism is the moving mechanism for zooming.

Description will now be made of the focus adjusting mechanism of the projection lens system for one-to-one magnification imaging. In FIGS. 6A and 6B, it is to be understood that the position of the dowel 14 is the position for one-to-one magnification imaging. If the set screw 15 is then loosened, the dowel 14 will become movable independently of the inner barrel 11. Thus, the set screw 15 is loosened in the position shown in FIG. 6A. At this time, the end of the set screw 15 remains in the screw groove of the inner barrel 11 and accordingly, if the set screw 15 is moved, the inner barrel is also moved. When the dowel 14 is then rotated to move the set screw 15 to its position shown in FIG. 6B, the inner barrel 11 is also moved in the direction of the optical axis while being rotated. The amount of movement of the inner barrel 11 at this time is the amount of movement ΔL of the set screw 15 in the direction of the optical axis. The dowel 14 is rotated by a desired amount to move the inner barrel 11, whereafter the set screw 15 is tightened so that the dowel 14 and the inner barrel 11 become integral, whereby the abovedescribed zooming is accomplished.

In a zoom lens which is symmetrical with respect to the diaphragm 7 as shown in FIG. 4, it is desirable for the correction of aberrations that the movable groups G2, G3 and G4 disposed on the opposite sides of the diaphragm be moved symmetrically with respect to the diaphragm. However, where the amount of movement of the lenses movable by rotation of the dowel 14 is minute, even if one lens is moved with respect to the diaphragm 7, the errors in the focus and magnification at each zoom position are negligible.

What I claim is:

1. In a copying apparatus capable of varying the imaging magnification of the image of an original projected upon a photosensitive medium, a combination comprising:

an imaging optical system for forming the image of the original on the photosensitive medium, said imaging optical system comprising a plurality of optical elements, including at least one magnification changing optical element capable of changing its position relative to the other said optical elements to vary the focal length of said imaging optical system; and a member for supporting said imaging optical system, said member including first moving means for moving said one magnification changing optical element by a minute amount in the direction of the optical axis to compensate for variations in tolerance in the copying apparatus, and second moving means for moving said magnification changing optical elements by a predetermined amount to vary the focal length of said imaging optical system said second moving means moving said magnification changing optical elements independently of said first moving means.

2. A copying apparatus according to claim 1, further comprising means for moving said imaging optical system as a unit during magnification change.

3. A copying apparatus according to claim 2, wherein said imaging optical system is an optical system capable of effecting continuous magnification change.

4. In a copying apparatus capable of varying the imaging magnification of the image of an original projected upon a photosensitive medium, a combination comprising:

a zoom lens system for projecting the image of the original onto the photosensitive medium, said zoom lens system including a magnification changing lens element;

an inner barrel supporting said magnification changing lens element of said imaging lens system;

an outer barrel provided in contact with said inner barrel;

a first moving means for moving only said inner barrel in the direction of the optical axis of said zoom lens system; and a second moving means for moving said inner barrel along a predetermined zooming locus.

5. A copying apparatus according to claim 4, wherein said zoom lens is of a symmetrical shape relative to a diaphragm.

6. A method of adjusting the optical system of a copying apparatus capable of varying the imaging magnification of the image of an original projected upon a photosensitive medium, comprising the steps of:

moving at least one lens element movable for magnification change in an imaging optical system, by means of a moving mechanism distinct from that for magnification change, to cause two points disposed at predetermined positions to assume an optically conjugate positional relation; and moving a reflecting member disposed between the surface of the original and the photosensitive medium to render the surface of the original and the photosensitive medium to assume optically conjugate positions by disposing said imaging optical system in said copying apparatus.

7. In a copying apparatus capable of varying the imaging magnification of the image of an original projected upon a photosensitive medium, a combination comprising:

an imaging optical system for forming the image of the original on the photosensitive medium, said imaging optical system comprising a plurality of optical elements, including at least one magnification changing element capable of moving from a starting point along a predetermined path to change the position of said one optical element relative to the other said optical elements to vary the focal length of said imaging optical system; and a member for supporting said imaging optical system, said member including first moving means for adjusting the position of said starting point relative to at least one of the others of said optical elements while maintaining the distance between said starting point and one end of said predetermined path constant to compensate for variations in tolerance in the copying apparatus, and second moving means for moving said one optical element to vary the focal length of said imaging optical system.

* * * * *